US012692942B2

(12) United States Patent
Watanabe et al.

(10) Patent No.: US 12,692,942 B2
(45) Date of Patent: Jul. 28, 2026

(54) RUBBER-METAL LAMINATE AND GASKET

(71) Applicant: NOK CORPORATION, Tokyo (JP)

(72) Inventors: Isao Watanabe, Fukushima (JP); Ryota Shimura, Fukushima (JP); Daiki Takekawa, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 286 days.

(21) Appl. No.: 17/912,292

(22) PCT Filed: Mar. 10, 2021

(86) PCT No.: PCT/JP2021/009584
§ 371 (c)(1),
(2) Date: May 15, 2023

(87) PCT Pub. No.: WO2021/187274
PCT Pub. Date: Sep. 23, 2021

(65) Prior Publication Data
US 2023/0304581 A1 Sep. 28, 2023

(30) Foreign Application Priority Data

Mar. 17, 2020 (JP) ................................. 2020-046857

(51) Int. Cl.
*F16J 15/08* (2006.01)
(52) U.S. Cl.
CPC ................................. *F16J 15/0825* (2013.01)
(58) Field of Classification Search
CPC ................. F16J 15/0818; F16J 15/0825; F16J 2015/0856
See application file for complete search history.

(56) References Cited

U.S. PATENT DOCUMENTS

| | | | |
|---|---|---|---|
| 5,587,413 A | 12/1996 | Enokida et al. | |
| 5,744,640 A | 4/1998 | Enokida et al. | |
| 2003/0075875 A1 | 4/2003 | Kato | |
| 2010/0086769 A1 | 4/2010 | Yokota et al. | |
| 2010/0190018 A1* | 7/2010 | Higashira | C09D 7/61 |
| | | | 427/388.1 |
| 2014/0004363 A1 | 1/2014 | Yokota et al. | |
| 2016/0001523 A1 | 1/2016 | Sasaki et al. | |
| 2019/0309186 A1 | 10/2019 | Watanabe et al. | |
| 2020/0354548 A1 | 11/2020 | Watanabe et al. | |

FOREIGN PATENT DOCUMENTS

| | | | | |
|---|---|---|---|---|
| CN | 101678643 A | 3/2010 | | |
| CN | 103517942 A | 1/2014 | | |
| CN | 104289408 A | 1/2015 | | |
| CN | 105431291 A | 3/2016 | | |
| EP | 2 692 789 A1 | 2/2014 | | |
| EP | 2 130 671 B1 | 2/2018 | | |
| JP | H08-193153 A | 7/1996 | | |
| JP | H11-216799 A | 8/1999 | | |
| JP | 2002-003648 A | 1/2002 | | |
| JP | 2003-130224 A | 5/2003 | | |
| JP | 2005-074721 A | 3/2005 | | |
| JP | 2007-083733 A | 4/2007 | | |
| JP | 2009-249616 A | 10/2009 | | |
| JP | 2010-285560 A | 12/2010 | | |
| JP | 4626223 B2 | 2/2011 | | |
| JP | 2012-214542 A | 11/2012 | | |
| JP | 2018-091417 A | 6/2018 | | |
| JP | 2020158721 A * | 10/2020 | ............... | C08K 3/04 |
| WO | 2009/016922 A1 | 2/2009 | | |
| WO | 2018/105531 A1 | 6/2018 | | |
| WO | 2019/093081 A1 | 5/2019 | | |
| WO | 2019/102747 A1 | 5/2019 | | |
| WO | WO-2020184432 A1 * | 9/2020 | .......... | C08F 214/262 |

OTHER PUBLICATIONS

Machine Translation of WO2020184432 A1 (Year: 2024).*
EESR issue in EP Patent Application No. 21772139.8, Feb. 8, 2024.
First Office Action issued in CN Patent Application No. 202180021996.
2, Aug. 4, 2023, translation.
ISR issued in International Patent Application No. PCT/JP2021/009584, May 25, 2021, translation.
Written Opinion issued in International Patent Application No. PCT/JP2021/009584, May 25, 2021, translation.
IPRP issued in International Patent Application No. PCT/JP2021/009584, Sep. 20, 2022, translation.
First Office Action issued in JP Patent Application No. 2022-508258, Nov. 1, 2023, translation.
Second Office Action issued in CN Patent Application No. 202180021996.2, Dec. 22, 2023, translation.
2nd Office Action issued in JP Patent Application No. 2022-508258, Apr. 2, 2024, translation.
1st Office Action issued in CN Patent Application No. 202180021996.2, Mar. 28, 2024, translation.
Decision of Refusal issued in JP Patent Application No. 2022-508258, Sep. 3, 2024, translation.
Office Action issued in CN application No. 202410846933.6, dated Dec. 22, 2025, translation.
Second Office Action issued in CN Patent Application No. 202410846933.6, Jun. 6, 2026, translation.

* cited by examiner

*Primary Examiner* — Gilbert Y Lee
(74) *Attorney, Agent, or Firm* — GREENBLUM & BERNSTEIN, P.L.C

(57) ABSTRACT

A rubber-metal laminate that includes a metal member; and a rubber layer provided on the metal member, wherein the rubber layer has a 100%-modulus value in accordance with JIS K6251 of 6.0 MPa or more and a thickness of less than 80 μm. The gasket includes the rubber-metal laminate.

8 Claims, No Drawings

RUBBER-METAL LAMINATE AND GASKET

CROSS REFERENCE TO RELATED APPLICATIONS

This is the National Stage of International Application No. PCT/JP2021/009584, filed Mar. 10, 2021, which claims the benefit of Japanese Patent Application No. 2020-046857 filed Mar. 17, 2020. The contents of these applications are incorporated hereby by reference in their entirety.

TECHNICAL FIELD

The present disclosure relates to a rubber-metal laminate and a gasket, and particularly to a rubber-metal laminate and gasket in which a rubber layer is provided on a metal member.

BACKGROUND ART

A metal gasket that is sandwiched between two members, such as a cylinder head and cylinder block in an engine, for sealing has been conventionally proposed (for example, see Japanese Patent Application Publication No. 2003-130224). This metal gasket includes a rubber-metal laminate including a metal substrate and a rubber layer provided on both main surfaces of the metal substrate. The metal gasket described in Japanese Patent Application Publication No. 2003-130224 seals a gap between the cylinder head and the cylinder block, which are sealing target members, with fastening of the rubber-metal laminate between the cylinder head and the cylinder block.

SUMMARY OF DISCLOSURE

Technical Problem

In the metal gasket described in Japanese Patent Application Publication No. 2003-130224, the rubber-metal laminate is fastened between metal members such as the cylinder head and the cylinder block, and thereby a strong compressive stress is applied to the rubber-metal laminate in use. With such a rubber-metal laminate, the rubber layer is deformed by application of the compressive stress in use, which may cause the rubber to protrude from the rubber-metal laminate, and fail to yield desired functions.

To inhibit the protrusion of the rubber due to the deformation of the rubber layer, it is effective to blend a filler such as carbon black and silica into the rubber layer to increase a hardness of the rubber layer. However, increase in the hardness of the rubber layer may deteriorate sealability of the sealing target members with the rubber layer. To inhibit the protrusion of the rubber, it is investigated that a blending amount of sulfur used as a crosslinking agent of a rubber layer composition is increased to increase a crosslinking density of the rubber layer. Unfortunately, even when the crosslinking density of the rubber layer is increased, a remarkable effect of inhibiting the protrusion of the rubber is not expected. As above, in the conventional rubber-metal laminates, the protrusion of the rubber may not be sufficiently inhibited only with increasing the hardness, and a relationship between the property and protrusion of the rubber has not been found actually.

The present disclosure provides a rubber-metal laminate and gasket that can prevent the protrusion of the rubber layer upon application of the compressive stress and that have excellent sealability of the sealing target members.

Solution to Problem

A rubber-metal laminate according to the present disclosure is comprises a metal member; and a rubber layer provided on the metal member, wherein the rubber layer has a 100%-modulus value in accordance with JIS K6251 of 6.0 MPa or more and a thickness of less than 80 μm.

According to the rubber-metal laminate according to the present disclosure, since the rubber layer has a 100%-modulus value of 6.0 MPa or more and a thickness of less than 80 μm, an elastic modulus of the rubber layer appropriately increases. According to this rubber layer, the rubber-metal laminate can prevent deterioration of processability with kneading the rubber composition and sealability of the rubber layer, and achieve an elastic modulus required for the rubber layer compared with a case where the hardness of the rubber layer is increased with a filler. As a result, even when the compressive stress is applied to the rubber-metal laminate, the protrusion of the rubber layer from the rubber-metal laminate can be further prevented, and the rubber-metal laminate having excellent sealability of the sealing target members can be achieved.

In the rubber-metal laminate, it is preferable that the rubber layer have a 100%-modulus value in accordance with JIS K6251 of 6.0 MPa or more. According to this constitution, the rubber-metal laminate can prevent deterioration of the processability with kneading and the sealability, and can sufficiently achieve an elastic modulus required for the rubber layer. As a result, even when the compressive stress is applied to the rubber-metal laminate, the protrusion of the rubber layer from the rubber-metal laminate can be further prevented, and thereby the sealability of the sealing target members is further improved.

In the rubber-metal laminate, it is preferable that the rubber layer have an elongation value in accordance with JIS K6251 of 100% or more. According to this constitution, since the elongation value of the rubber layer is within an appropriate range, the protrusion of the rubber layer from the rubber-metal laminate can be further prevented even when the compressive stress is applied to the rubber-metal laminate. Therefore, the sealability of the sealing target members is further improved.

In the rubber-metal laminate, it is preferable that the rubber layer have a thickness of 25 μm or more. According to this constitution, the rubber-metal laminate has a relationship between the 100%-modulus value and thickness of the rubber layer within an appropriate range, and the elastic modulus of the rubber layer further increases. As a result, the protrusion of the rubber layer from the rubber-metal laminate can be further prevented even when the compressive stress is applied to the rubber-metal laminate. Therefore, the sealability of the sealing target members is further improved.

In the rubber-metal laminate, it is preferable that the rubber layer contain 28 mass % or more of carbon black based on a total mass of the rubber layer. According to this constitution, the rubber-metal laminate can prevent deterioration of the sealability and achieve an elastic modulus required for the rubber layer. As a result, even when the compressive stress is applied to the rubber-metal laminate, the rubber-metal laminate can further prevent the protrusion of the rubber layer from the rubber-metal laminate, and the sealability of the sealing target members can be further improved.

In the rubber-metal laminate, it is preferable that the metal sheet and the rubber layer be bonded with at least one adhesive selected from the group consisting of a phenolic resin and an epoxy resin. According to this constitution, since the adhesiveness between the metal sheet and the rubber layer is improved, the protrusion of the rubber layer from the rubber-metal laminate can be further prevented, and the sealability of the sealing target members can be further improved.

In the rubber-metal laminate, it is preferable that the rubber layer contain a nitrile rubber. According to this constitution, since the nitrile rubber contained in the rubber layer has appropriate elasticity, even when the compressive stress is applied to the rubber-metal laminate, the rubber-metal laminate can further prevent the protrusion of the rubber layer from the rubber-metal laminate, and the sealability of the sealing target members can be further improved.

The gasket according to the present disclosure comprises the above rubber-metal laminate.

According to the gasket according to the present disclosure, since the rubber layer has a 100%-modulus value of 6.0 MPa or more and a thickness of less than 80 $\mu$m, an elastic modulus of the rubber layer appropriately increases. According to this rubber layer, the gasket can prevent deterioration of processability with kneading the rubber composition and sealability of the rubber layer, and an elastic modulus required for the rubber layer can be achieved compared with a case where the hardness of the rubber layer of the rubber-metal laminate is increased with a filler. As a result, even when the compressive stress is applied to the gasket, the protrusion of the rubber layer from the rubber-metal laminate can be further prevented, and thereby the gasket having excellent sealability of the sealing target members can be achieved.

Effects of Disclosure

According to the present disclosure, the rubber-metal laminate and gasket that can prevent the protrusion of the rubber layer upon application of the compressive stress and that have excellent sealability of the sealing target members can be achieved.

Description of Embodiments

Hereinafter, embodiments of the present invention present disclosure will be described in detail.

The rubber-metal laminate according to an embodiment of the present disclosure is preferably used as a sealing member such as a gasket. The metal laminate according to the present embodiment includes a metal member and a rubber layer provided on at least one main surface of the metal member. The rubber layer has a 100%-modulus value of 6.0 MPa or more and a thickness of less than 80 $\mu$m. Hereinafter, each component of the rubber-metal laminate according to the present embodiment will be described in detail.

(Metal Member)

As the metal member, a metal sheet such as, for example, iron, stainless steel, aluminum, magnesium, zinc-plated steel, and copper is used. As iron, a cold rolled steel sheet (SPCC: Steel Plate Cold Commercial), a high-tensile steel sheet, a soft steel sheet, and the like are used, for example. As stainless steel, ferrite-type, martensite-type, austenite-type stainless steel sheet, and the like can be used, for example. As specific examples of stainless steel, SUS304, SUS301, SUS301H, SUS430, and the like can be mentioned, for example. As aluminum, an aluminum sheet, an aluminum die-cast sheet, and the like are used.

It is preferable that the metal member be used in a state where the surface is defatted with an alkali defatting treatment or the like. The metal member is used with the metal surface roughened by shot blasting, Scotch-Brite®, hairline, dull-finish and the like, if necessary.

In the metal member, it is preferable that an adhesion surface with the adhesive be subjected to a substrate treatment (surface treatment). The substrate treatment is not particularly limited, and known substrate treatments can be used. For the substrate treatment when an iron material and a stainless steel material such as a cold rolled steel sheet and a high-tensile steel sheet are used as the metal member, a chemical treatment method using various chemical treating agent, and various plating methods such as an electrical plating and a hot-dip plating with a metal such as zinc are preferable. As the chemical treating agent for the metal member, for example, phosphate treating agents such as a zinc phosphate treating agent and an iron phosphate treating agent, and coating-type chromate treating agent can be mentioned. As the chemical treating agent, a chromium-free chemical treating agent containing substantially no chromium is preferable from the viewpoint of environmental protection.

The substrate treatment for the metal member with the chemical treating agent is performed by contacting the chemical treating agent with the metal member with known liquid-contacting methods such as atomizing, spraying, immersing, brush coating, and a roll coater. In a case of a reactive chemical treating agent, it is needed that a time and temperature required for the reaction are prepared.

A thickness of the metal member is appropriately set according to a use of the rubber-metal laminate. When the rubber-metal laminate is used for a sealing material such as a gasket, it is preferable that the thickness of the metal member be 100 $\mu$m or more and 2000 $\mu$m or less, it is more preferable that it be 150 $\mu$m or more and 1000 $\mu$m or less, and it is further preferable that it be 200 $\mu$m or more and 500 $\mu$m or less, for example.

In the rubber-metal laminate, it is preferable that a primer layer be formed on the metal member in addition to the substrate treatment or instead of the substrate treatment. By performing the substrate treatment or providing the primer layer, adhesiveness between the rubber layer and the metal member in the rubber-metal laminate is improved, and heat resistance and water resistance of the rubber-metal laminate can be remarkably improved. In addition, by performing the substrate treatment or forming the primer layer in the rubber-metal laminate, the rubber-metal laminate can be preferably used as a gasket that is a laminated complex metal in which the rubber-metal laminate is laminated with another metal sheet and the like.

The primer layer can be provided by: a silicon compound; compounds of metals such as titanium, zirconium, vanadium, aluminum, molybdenum, tungsten, manganese, zinc, and cerium, and inorganic compounds such as an oxide thereof; and organic compounds such as a silicone resin, a phenolic resin, an epoxy resin, and polyurethane. The primer layer can be provided by using commonly commercially available primer solutions, and other primer solutions of various known art.

The primer layer is provided by a primer solution in which a raw material containing the above various inorganic compounds or organic compounds is dissolved or dispersed in an organic solvent or an aqueous solvent. As a usable organic solvent, alcohols such as methanol, ethanol, and isopropyl alcohol, ketones such as acetone and methyl ethyl ketone, and the like can be mentioned, for example. The primer solution may be prepared as an aqueous solution using an aqueous solvent as long as it maintains the liquid stability.

The obtained primer solution is applied onto the metal sheet by using a spray, immersion, a brush, a roll coater, and the like. Then, the primer layer is provided by drying the primer solution applied onto the metal sheet at room temperature or with warm blowing, or by baking treatment.

(Adhesive)

The adhesive bonds the rubber layer and the metal member. As the adhesive, commonly commercially available adhesives such as a phenolic resin, an epoxy resin, a polyurethane resin, and a silane are used. These adhesives can be appropriately selected according to use of the rubber-metal laminate.

In the rubber-metal laminate, it is preferable that the metal sheet and the rubber layer be bonded with at least one selected from the group consisting of a phenolic resin and an epoxy resin. Since the adhesiveness between the metal sheet and the rubber layer in the rubber-metal laminate is improved by this adhesive, the protrusion of the rubber layer from the rubber-metal laminate upon application of the compressive stress can be further prevented, and the sealability of the sealing target members can be further improved.

As the phenolic resin, a novolac-type phenolic resin and a resol-type phenolic resin are used, for example. The novolac-type phenolic resin and the resol-type phenolic resin may be used singly, or may be used in combination of two or more thereof. As the adhesive, an adhesive containing two phenolic resins of the novolac-type phenolic resin and the resol-type phenolic resin and an unvulcanized nitrile rubber may be used.

As the novolac-type phenolic resin, a product obtained with a condensation reaction between phenols and formaldehyde in the presence of an acid catalyst is used. As the phenols, ones having two or three substitutable hydrogen atoms at at least one of o-position and p-position with respect to a phenolic hydroxy group of, for example, phenol, p-cresol, m-cresol, p-tert-butylphenol, p-phenylphenol, and bisphenol A are used. These phenolic resins may be used singly, or may be used in combination of two or more thereof. As the acid catalyst, oxalic acid, hydrochloric acid, maleic acid, and the like are used, for example. Among them, it is preferable that the novolac-type phenolic resin have a melting point of 80° C. or higher and 150° C. or lower, and it is more preferable that it be obtained by using m-cresol and formaldehyde and have a melting point of 120° C. or higher, from the viewpoint of improvement in the adhesiveness between the metal sheet and the rubber layer.

As the resol-type phenolic resin, a product obtained with a condensation reaction between phenols and formaldehyde in the presence of a base catalyst is used. As the phenols, ones having two or three substitutable hydrogen atoms at at least one of o-position and p-position with respect to a phenolic hydroxy group of, for example, phenol, p-cresol, m-cresol, p-tert-butylphenol, p-phenylphenol, and bisphenol A are used. These phenolic resins may be used singly, or may be used in combination of two or more thereof. As the base catalyst, ammonia, alkali metal hydroxides such as sodium hydroxide, magnesium hydroxide, and sodium carbonate, and the like are used, for example.

As the epoxy resin, a bisphenol A-type, cresol-novolac-type, biphenyl-type, and brominated epoxy resins can be mentioned. These epoxy resins may be used singly, or may be used in combination of two or more thereof. Among these epoxy resins, the bisphenol A-type epoxy resin and the cresol-novolac-epoxy resin are preferable from the viewpoint of easy availability of a commercial product and the viewpoint of excellence in heat resistance. As the bisphenol A-type epoxy resin, commercial products such as "EPICLON 860", "EPICLON 1055", "EPICLON 2050", "EPICLON 3050", "EPICLON 4050", "EPICLON 7050", and "EPICLON HM-091", which are trade names of DIC Corporation, may be used, for example. As the commercial product of the cresol-novolac-type epoxy resin, commercial products such as "EPICLON N-660", "EPICLON N-670", "EPICLON N-680", and "EPICLON N-690", which are trade names of DIC Corporation, may be used, for example.

The above various adhesives are dissolved in an organic solvent to be used as a solution. As the organic solvent, ketones such as methyl ethyl ketone and methyl isobutyl ketone, aromatic hydrocarbons such as toluene and xylene, and the like are used, for example. These organic solvents may be used singly, or may be used in combination of two or more thereof.

It is preferable that the adhesive be blended at a proportion of, for example, 10 parts by mass or more and 1000 parts by mass or less of the resol-type phenolic resin per 100 parts by mass of the novolac-type phenolic resin, and it is more preferable that it be blended at a proportion of 60 parts by mass or more and 400 parts by mass or less. By blending the adhesive at a proportion of 1000 parts by mass or less of the resol-type phenolic resin per 100 parts by mass of the novolac-type phenolic resin, deterioration of the adhesiveness of the rubber layer can be prevented. In addition, by setting the proportion to 10 parts by mass or more, deterioration of the adhesiveness to the surface of the metal member can be prevented.

It is preferable that the adhesive be provided on the metal sheet on which the primer layer is formed from the viewpoint of improvement in the adhesiveness between the metal member and the rubber layer. The adhesive layer may be provided as a single layer, and may be provided as a multilayer. The adhesive layer may be provided as a multistage structure by forming a phenolic adhesive layer including an organometal compound on the primer layer provided on the metal member, and then, on the adhesive layer providing an additional phenolic adhesive layer. By forming such an adhesive layer of the multistage structure, the adhesiveness between the primer layer and the rubber layer can be further strengthened.

The adhesive is prepared as an adhesive solution at a solid-content concentration of 1 mass % or more and 10 mass % or less by using ketone-type organic solvents such as acetone, methyl ethyl ketone, methyl isobutyl ketone, and a mixed solvent thereof. The solution of the adhesive is applied onto the metal member, and then subjected to drying and baking treatment under a condition at 100° C. or higher and 250° C. or lower for approximately 1 minute or longer or 30 minutes, to be formed into an adhesive layer. It is preferable that the amount of the adhesive applied be such that the coating mass after drying and baking treatment following application is within a range of 50 mg/m² or more and 2000 mg/m² or less. It is preferable that the adhesive be applied so that the thickness of the adhesive layer after the drying is 0.5 μm or more and 5 μm or less.

(Rubber Layer)

In the rubber-metal laminate according to the preset embodiment, the rubber layer has a 100%-modulus value in accordance with JIS K6251 of 6.0 MPa or more. According to this rubber layer, the rubber layer has an appropriate elastic modulus even when a high compressive stress is applied to the rubber-metal laminate, and the protrusion of the rubber layer from the rubber-metal laminate can be inhibited. Therefore, the sealability of the sealing target members is improved. In addition, since the rubber-metal laminate has the appropriate elastic modulus without increasing the hardness of the rubber layer, the sealability of the sealing target members is improved with preventing deterioration of the processability with kneading and the sealability, and maintaining flexibility of the rubber. It is more preferable that the 100%-modulus value of the rubber layer be 8.0 MPa or more, and it is further preferable that it be 10 MPa or more from the viewpoint of further improvement in the above effect, and it is more preferable that it be 30 MPa or less, it is more preferable that it be 25 MPa or less, and it is further preferable that it be 20 MPa or less.

In the rubber-metal laminate according to the present embodiment, it is preferable that the rubber layer have an elongation value in accordance with JIS K6251 of 100% or more. According to this rubber layer, since the elongation value of the rubber layer is within an appropriate range, the protrusion of the rubber layer from the rubber-metal laminate can be further prevented even when the compressive stress is applied to the rubber-metal laminate. Therefore, the sealability of the sealing target members is further improved. It is more preferable that the elongation value of the rubber layer be 140% or more, and it is further preferable that it be 170% or more from the viewpoint of further improvement in the above effect, and it is preferable that it be 300% or less, it is more preferable that it be 275% or less, and further preferable that it be 250% or less.

In the rubber-metal laminate according to the present embodiment, it is preferable that the rubber layer have a hardness in accordance with JIS K6253 of 65 or more and 100 or less, it is more preferable that it be 70 or more and 95 or less, and it is further preferable that it be 80 or more and 90 or less, from the viewpoint of the appropriate elastic modulus obtained without exceedingly increasing the hardness of the rubber layer to improve the sealability of the sealing targets member with preventing deterioration of the processability with kneading and the sealability.

It is preferable that the rubber-metal laminate according to the present embodiment have a tensile strength measured in accordance with JIS K6251 of 7.5 MPa or more and 30 MPa or less, it is more preferable that it be 10 MPa or more and 27.5 MPa or less, and it is further preferable that it be 12 MPa or more and 25 MPa or less, from the viewpoint of improvement in the sealability of the sealing target members with preventing the protrusion of the rubber layer upon application of the compressive stress.

The rubber layer can be obtained by using various rubber materials within a range that provides the effect of the present disclosure. As the rubber material, various rubber materials such as, for example, a nitrile rubber which is an acrylonitrile-butadiene copolymer (Nitrile Butadiene Rubber: NBR), a hydrogenated nitrile rubber in which the unsaturated bond portion of the nitrile rubber is hydrogenated (HNBR), and a fluorinated rubber can be mentioned. Among them, the nitrile rubber and the hydrogenated nitrile rubber are preferable, and the nitrile rubber is more preferable, from the viewpoint of prevention of the protrusion of the rubber layer from the rubber-metal laminate and improvement in the sealability. When the rubber layer is used for various gaskets such as a cylinder head gasket for automobiles, it is preferable that the rubber layer contain at least one rubber selected from the group consisting of the fluorinated rubber and the nitrile rubber, and it is preferable that the rubber layer contain the nitrile rubber. By cross-linking the rubber layer, more excellent heat resistance and adhesiveness are obtained.

In the nitrile rubber, it is preferable that a bound acrylonitrile content be 18% or more and 48% or less, it is more preferable that it be 31% or more and 42% or less, and it is further preferable that the nitrile rubber be a medium high nitrile having a bound acrylonitrile content of 31% or more and less than 36%, from the viewpoint of improvement in the adhesiveness between the rubber layer and the adhesive and the viewpoint of improvement in cold resistance. It is preferable that the nitrile rubber have a Mooney viscosity $ML_{1+4}$ (100° C.) of 30 or more and 85 or less from the viewpoint of improvement in friction resistance and abrasion characteristics and the viewpoint of improvement in kneading processability, and an acrylonitrile-butadiene copolymer rubber having the Mooney viscosity of 40 or more and 70 or less is used. As the nitrile rubber, commercial products such as trade name "Nipol® DN3350" (manufactured by Zeon Corporation) may be used.

It is preferable that the rubber layer contain a rubber composition containing carbon black from the viewpoint of increase in the hardness of the rubber layer to prevent the protrusion of the rubber layer from the rubber-metal laminate when the compressive stress is applied to the rubber-metal laminate.

As the carbon black, hard carbons such as Super Abrasion Furnace (SAF) carbon black, Intermediate Super Abrasion Furnace (ISAF) carbon black, High Abrasion Furnace (HAF) carbon black, and Easy Processing Channel (EPC) carbon black; and soft carbon blacks such as extra Conductive Furnace (XCF) carbon black, Fast Extruding Furnace (FEF) carbon black, General Purpose Furnace (GPF) carbon black, High Modulus Furnace (HMF) carbon black, Semi-Reinforcing Furnace (SRF) carbon black, Fine Thermal (FT) carbon black, and Medium Thermal (MT) carbon black can be mentioned. These carbon blacks may be used singly, or may be used in combination of two or more thereof. Among them, the soft carbons are preferable as the carbon black, and among the soft carbons, the Semi-Reinforcing Furnace carbon black and the Medium Thermal carbon black are preferable. As the carbon black, commercial products of the Medium Thermal carbon black such as trade name "THERMAX® N990 LSR" (manufactured by Cancarb Ltd.) may be used, and commercial products of the Semi-Reinforcing Furnace carbon black such as trade name "HTC #SS" (manufactured by NIPPON STEEL Carbon Co., Ltd.) and trade name "ASAHI #50HG" (manufactured by Asahi Carbon Co., Ltd.) may be used.

It is preferable that a blending amount of the carbon black be 50 parts by mass or more and 300 parts by mass or less, it is more preferable that it be 70 parts by mass or more and 250 parts by mass or less, and it is further preferable that it be 85 parts by mass or more and 200 parts by mass or less, per 100 parts by mass of the rubber component from the viewpoint of prevention of the protrusion of the rubber layer from the rubber-metal laminate upon application of the compressive stress to improve the sealability.

It is preferable that the blending amount of the carbon black be 28 mass % or more and 80 mass % or less, it is more preferable that it be 30 mass % or more and 70 mass % or less, and it is further preferable that it be 40 mass % or more and 60 mass % or less, based on the total mass of the rubber composition from the viewpoint of prevention of the protrusion of the rubber layer from the rubber-metal laminate upon application of the compressive stress to improve the sealability.

When the carbon black is the MT carbon, it is preferable that the blending amount of the carbon black be 50 parts by mass or more and 250 parts by mass or less, it is more preferable that it be 70 parts by mass or more and 200 parts by mass or less, and it is further preferable that it be 85 parts by mass or more and 175 parts by mass or less, per 100 parts by mass of the rubber component from the viewpoint of prevention of the protrusion of the rubber layer from the rubber-metal laminate upon application of the compressive stress to improve the sealability.

When the carbon black is the MT carbon, it is preferable that the blending amount of the carbon black be 28 mass % or more and 80 mass % or less, it is more preferable that it be 30 mass % or more and 70 mass % or less, and it is further preferable that it be 40 mass % or more and 60 mass % or less, based on the total mass of the rubber composition from the viewpoint of prevention of the protrusion of the rubber layer from the rubber-metal laminate upon application of the compressive stress to improve the sealability.

When the carbon black is the SRF carbon, it is preferable that the blending amount of the carbon black be 35 parts by mass or more and 200 parts by mass or less, it is more preferable that it be 45 parts by mass or more and 150 parts by mass or less, and it is further preferable that it be 50 parts by mass or more and 125 parts by mass or less, per 100 parts by mass of the rubber component from the viewpoint of prevention of the protrusion of the rubber layer from the rubber-metal laminate upon application of the compressive stress to improve the sealability.

When the carbon black is the SRF carbon, it is preferable that the blending amount of the carbon black be 25 mass % or more and 70 mass % or less, it is more preferable that it be 27.5 mass % or more and 60 mass % or less, and it is further preferable it be 30 mass % or more and 50 mass % or less, based on the total mass of the rubber composition from the viewpoint of prevention of the protrusion of the rubber layer from the rubber-metal laminate upon application of the compressive stress to improve the sealability.

The rubber composition is provided by applying the rubber composition onto the metal member or the primer layer, and then crosslinking the rubber composition. It is preferable that the rubber composition contain a vulcanizer or a vulcanizing accelerator. As the vulcanizer, commercial products such as COLLOIDAL SULFUR A (manufactured by Tsurumi Chemical Industry Co., Ltd.) and trade name "Vulnoc® R" (4,4'-dithiodimorpholine: manufactured by OUCHI SHINKO CHEMICAL INDUSTRIAL CO., LTD.) may be used, for example. A blending amount of the vulcanizer is, for example, 0.1 part by mass or more and 10 parts by mass or less per 100 parts by mass of the rubber component.

As the vulcanizing accelerator, various sulfur-containing vulcanizing accelerators such as guanidine-type, aldehyde-amine-type, aldehyde-ammonia-type, thiazole-type, sulfenamide-type, thiourea-type, thiuram-type, dithiocarbamate-type, and xanthate-type vulcanizing accelerators are used. Among them, the sulfur-containing as vulcanizing accelerator, tetramethylthiuram disulfide, tetrabenzylthiuram disulfide, N-cyclohexyl-2-benzothiazylsulfenamide, and the like are preferable. As the vulcanizing accelerator, commercial products such as trade name "Nocceler® TBZTD" (tetrabenzylthiuram disulfide, manufactured by OUCHI SHINKO CHEMICAL INDUSTRIAL CO., LTD.), trade name "Nocceler® CZ-P" (N-cyclohexyl-2-benzothiazylsulfenamide, manufactured by OUCHI SHINKO CHEMICAL INDUSTRIAL CO., LTD.), and "Nocceler® TT-P" (tetramethylthiuram disulfide, manufactured by OUCHI SHINKO CHEMICAL INDUSTRIAL CO., LTD.) may be used. A blending amount of the vulcanizing accelerator is, for example, 1 part by mass or more and 20 parts by mass or less per 100 parts by mass of the rubber component.

The rubber composition may contain fillers such as calcium carbonate and silica, if necessary. As the calcium carbonate, various calcium carbonates such as heavy calcium carbonate and synthesized calcium carbonate can be used. As the calcium carbonate, commercial products such as trade name "Whiton SB-Red" (heavy calcium carbonate, manufactured by BIHOKU FUNKA KOGYO CO., LTD.) may be used. It is preferable that a blending amount of the calcium carbonate be, for example, 10 parts by mass or more and 100 parts by mass or less per 100 parts by mass of the rubber component.

As the silica, various silicas may be used within a range that provides the effect of the present disclosure. As the silica, amorphous silicas such as: silica with dry method manufactured with a pyrolysis method with a halogenated silicic acid or an organic silicon compound, a method of air-oxidizing silicon oxide (SiO) vaporized by heat-reducing silica sand, and the like; and silica with wet method manufactured with pyrolysis method with sodium silicate and the like may be used. As the silica, commercial products such as trade name "Nipsil E-74P" (manufactured by TOSOH SILICA CORPORATION) may be used. It is preferable that a blending amount of the silica be, for example, 5 parts by mass or more and 50 parts by mass or less per 100 parts by mass of the rubber component.

The rubber composition may contain auxiliaries commonly used in the rubber industry such as a plasticizer, an acid acceptor such as zinc oxide, stearic acid, an antioxidant, and wax if necessary. As the plasticizer, commercial products such as trade name "ADK CIZER® RS107" (manufactured by ADEKA Corporation) can be mentioned, for example. A blending amount of the plasticizer is, for example, 1 part by mass or more and 50 parts by mass or less per 100 parts by mass of the rubber component.

As the acid acceptor, commercial products such as zinc oxide (manufactured by SEIDO CHEMICAL INDUSTRY CO., LTD.) may be used, for example. As the stearic acid, commercial products such as trade name "DTST" (manufactured by MIYOSHI OIL & FAT CO., LTD.) may be used, for example. As the antioxidant, commercial products such as trade name "Nocrac® 810-NA" (2,2,4-trimethyl-1,2-dihydroquinoline polymer: manufactured by OUCHI SHINKO CHEMICAL INDUSTRIAL CO., LTD.) may be used, for example. As the wax, commercial products such as trade name "SUNTIGHT® R" (microcrystalline wax: manufactured by Seiko Chemical Co., Ltd.) may be used, for example.

In the rubber-metal laminate according to the present embodiment, the rubber layer has a thickness of less than 80 μm. According to this thickness, a relationship between the 100%-modulus value and thickness of the rubber layer is within an appropriate range, and thereby the protrusion of the rubber layer from the rubber-metal laminate can be further prevented even when the compressive stress is applied to the rubber-metal laminate, and the sealability of the sealing target members can be further improved. It is preferable that the thickness of the rubber layer be 30 μm or more, it is more preferable that it be 40 μm or more and 75 μm or less, and it is further preferable that it be 45 μm or more and 70 μm or less, from the viewpoint of further improvement in the above effect.

<Method of Manufacturing Rubber-Metal Laminate>

The rubber-metal laminate according to the above embodiment is manufactured by using: the metal member such as a stainless steel sheet; and the rubber composition kneaded with a kneading machine such as an intermix, a kneader, and a Banbury mixer, or an open roll to which the rubber component and carbon black are blended, and the vulcanizer, the vulcanizing accelerator, calcium carbonate, silica, the plasticizer, and various auxiliaries are blended if necessary. The rubber-metal laminate is manufactured by applying the above rubber composition onto a metal member which has been subjected to the surface treatment if necessary, with the adhesive layer disposed therebetween; and then vulcanizing the rubber composition under a condition, for example, at 160° C. or higher and 250° C. or lower for approximately 0.5 minutes or longer and 30 minutes or shorter to form the rubber layer. It is preferable that the rubber composition be applied so that the thickness of the rubber layer after the application is 50 $\mu$m or more and 200 $\mu$m or less. In the rubber-metal laminate, coating agents such as a resin-type and graphite-type coating agent may be applied onto the rubber layer from the viewpoint of prevention of adhesion of the rubber.

A method of applying the rubber composition onto the metal member is not particularly limited as long as it can apply the rubber composition onto the metal member. As the method of applying the rubber composition, a spraying method, a dipping method, a roll-coating method, a dispenser method, and the like can be mentioned.

When the rubber composition is manufactured and applied onto the metal member, the viscosity may be regulated by adding an organic solvent into the rubber composition, if necessary. The organic solvent is not particularly limited as long as it can regulate the viscosity of the rubber composition to a desired viscosity. As the organic solvent, methyl ethyl ketone, toluene, ethyl acetate, and the like can be mentioned, for example. These organic solvents may be used singly, or may be used in combination of two or more thereof.

As described above, according to the above embodiment, the rubber layer has a 100%-modulus value of 6.0 MPa or more and a thickness of less than 80 $\mu$m. As a result, the elastic modulus of the rubber layer appropriately increases. According to this rubber layer, the rubber-metal laminate can prevent deterioration of the processability with kneading the rubber composition and sealability of the rubber layer, and achieve an elastic modulus required for the rubber layer compared with a case where the hardness of the rubber layer is increased with a filler. As a result, even when the compressive stress is applied to the rubber-metal laminate, the protrusion of the rubber layer from the rubber-metal laminate can be further prevented, and the rubber-metal laminate having excellent sealability of the sealing target members can be achieved. Although the protrusion in the rubber-metal laminate has been conventionally inhibited by simply increasing the hardness of the rubber, by performing development with focusing on the 100%-modulus value, the protrusion can be inhibited even with a low hardness, and the improvement in the sealability can be expected. In addition, since the protrusion of the rubber layer upon application of the compressive stress can be estimated with the 100%-modulus value even without actually producing the rubber-metal laminate, it reduces the evaluation process.

According to the above embodiment, a gasket including the rubber-metal laminate can be obtained. According to the gasket, the rubber layer has a 100%-modulus value of 6.0 MPa or more and a thickness of less than 80 $\mu$m. As a result, the elastic modulus of the rubber layer appropriately increases. According to this rubber layer, the gasket can prevent deterioration of the processability with kneading the rubber composition and sealability of the rubber layer, and achieve an elastic modulus required for the rubber layer compared with a case where the hardness of the rubber layer is increased with a filler. As a result, even when the compressive stress is applied to the gasket, the protrusion of the rubber layer from the gasket can be further prevented, and the gasket having excellent sealability of the sealing target members can be achieved.

EXAMPLE

Hereinafter, the present disclosure will be described in more detail based on Examples performed to clarify the effect of the present disclosure. The present disclosure is absolutely not limited to the following Examples and Comparative Examples.

The present inventors produced a rubber-metal laminate according to the present embodiment, and performed a compression test on the produced rubber-metal laminate to evaluate it. Hereinafter, the contents investigated by the present inventor will be described.

Example 1

<Evaluation of Thermo Plastics (TP) of Rubber>

Kneading 100 parts by mass of a nitrile-butadiene rubber (trade name "Nipol DN3350", manufactured by Zeon Corporation), 90 parts by mass of a carbon black A (Medium Thermal (MT) carbon black: trade name "THERMAX N990 LSR", manufactured by Cancarb Ltd.), 5 parts by mass of zinc oxide (manufactured by SEIDO CHEMICAL INDUSTRY CO., LTD.), 1 part by mass of stearic acid (trade name "DTST", manufactured by MIYOSHI OIL & FAT CO., LTD.), 2 parts by mass of an antioxidant (2,2,4-trimethyl-1,2-dihydroquinoline polymer: trade name "Nocrac 810-NA", manufactured by OUCHI SHINKO CHEMICAL INDUSTRIAL CO., LTD.), 2 parts by mass of a microcrystalline wax (trade name "SUNTIGHT R", manufactured by Seiko Chemical Co., Ltd.), 1.5 parts by mass of a vulcanizer A (COLLOIDAL SULFUR A, manufactured by Tsurumi Chemical Industry Co., Ltd.), 1 part by mass of a vulcanizer B (4,4'-dithiodimorpholine: trade name "Vulnoc R", manufactured by OUCHI SHINKO CHEMICAL INDUSTRIAL CO., LTD.), 5 parts by mass of a vulcanizing accelerator A (tetrabenzylthiuram disulfide: trade name "Nocceler TBZTD", manufactured by OUCHI SHINKO CHEMICAL INDUSTRIAL CO., LTD.), and 4 parts by mass of a vulcanizing accelerator B (N-cyclohexyl-2-benzothiazylsulfenamide: trade name "Nocceler CZ-P", manufactured by OUCHI SHINKO CHEMICAL INDUSTRIAL CO., LTD.) was performed with a kneader and an open roll to obtain a rubber composition. Then, the rubber composition was compressed at 170° C. for 8 minutes for vulcanization to produce a rubber sheet having a thickness of 2 mm. A hardness of the obtained rubber sheet was measured in accordance with JIS K6253, and a 100%-modulus value, a tensile strength, and an elongation were measured in accordance with JIS K6251.

<Production of Sample for Evaluation of Compression Test>

On a cold rolled steel sheet (SPCC: Steel Plate Cold Commercial) subjected to a surface treatment with a zinc phosphate treating agent and having a thickness of 250 $\mu$m, an adhesive in which 100 parts by mass of a phenolic resin (97 mass % of trade name "Sixon 715A" and 3 mass % of trade name "Sixon 715N", both of them are manufactured by Rohm and Haas Company) was diluted with organic solvents of 440 parts by mass of methyl ethyl ketone and 110 parts by mass of methanol was applied so as to have a thickness of 3 μm, and dried at room temperature. Then, the rubber composition having the blending component used in the above Thermo Plastics evaluation was dissolved in an organic solvent to regulate the viscosity to approximately 1000 to 10000 mPa·s, and applied onto the cold rolled steel sheet on which the phenolic resin was applied so that a thickness of the rubber layer after curing is 65 μm, and then vulcanized with an oven at 200° C. for 3 minutes to produce a sample for evaluation of a compression test of the rubber-laminated metal sheet. Here, an adhesion-preventing layer may be applied if necessary. The produced sample for evaluation of a compression test was evaluated with the following evaluation method. The results are shown in Table 1.

<Evaluation of Compression Test>

On the rubber layer of the sample for evaluation of a compression test of the rubber-laminated metal sheet, a metal part having a doughnut-like protruding shape was pressed under a condition at 150° C. for 5 minutes at a pressure of 150 MPa, and then a state of the rubber layer was evaluated based on the following criteria.

5 Points: No metal was exposed, and almost no rubber pouring was observed.

4 Points: No metal was exposed, and rubber pouring was small.

3 Points: Rubber pouring was not small, but the metal was not exposed.

2 Points: Rubber pouring was large, but metal exposure was small.

1 Point: Both rubber pouring and metal exposure were large.

Example 2

A sample for evaluation of a compression test of the rubber-laminated metal sheet was produced to be evaluated in the same manner as in Example 1 except that the blending amount of the carbon black A was set to 151 parts by mass. The results are shown in Table 1.

Example 3

A sample for evaluation of a compression test of the rubber-laminated metal sheet was produced to be evaluated in the same manner as in Example 1 except that 65 parts by mass of a carbon black B (SRF carbon black: trade name "HTC #SS", manufactured by NIPPON STEEL Carbon Co., Ltd.) was used instead of the carbon black A. The results are shown in Table 1.

Example 4

A sample for evaluation of a compression test of the rubber-laminated metal sheet was produced to be evaluated in the same manner as in Example 3 except that the blending amount of the carbon black B was set to 104 parts by mass. The results are shown in Table 1.

Example 5

A sample for evaluation of a compression test of the rubber-laminated metal sheet was produced to be evaluated in the same manner as in Example 4 except that the thickness of the rubber layer was set to 50 μm. The results are shown in Table 1.

Example 6

A sample for evaluation of a compression test of the rubber-laminated metal sheet was produced to be evaluated in the same manner as in Example 1 except that 56 parts by mass of a carbon black C (Semi-Reinforcing Furnace (SRF) carbon black: trade name "ASAHI #50HG", manufactured by Asahi Carbon Co., Ltd.) was used instead of the carbon black A. The results are shown in Table 1.

Example 7

A sample for evaluation of a compression test of the rubber-laminated metal sheet was produced to be evaluated in the same manner as in Example 1 except that 90 parts by mass of the carbon black C was used instead of the carbon black A. The results are shown in Table 1.

Example 8

A sample for evaluation of a compression test of the rubber-laminated metal sheet was produced to be evaluated in the same manner as in Example 1 except that: the blending amount of the carbon black A was set to 181 parts by mass; and 10 parts by mass of a plasticizer (trade name "ADK CIZER RS107", manufactured by ADEKA Corporation) was used. The results are shown in Table 1.

Example 9

A sample for evaluation of a compression test of the rubber-laminated metal sheet was produced to be evaluated in the same manner as in Example 1 except that: the blending amount of the carbon black A was set to 40 parts by mass; 60 parts by mass of the carbon black B was used; 60 parts by mass of calcium carbonate (trade name "Whiton SB-Red", manufactured by BIHOKU FUNKA KOGYO CO., LTD.) was used; 30 parts by mass of silica (trade name "Nipsil E-74P", manufactured by TOSOH SILICA CORPORATION) was used; and no vulcanizer B was used. The results are shown in Table 1.

Comparative Example 1

A sample for evaluation of a compression test of the rubber-laminated metal sheet was produced to be evaluated in the same manner as in Example 1 except that the blending amount of the carbon black A was set to 45 parts by mass. The results are shown in Table 1.

Comparative Example 2

A sample for evaluation of a compression test of the rubber-laminated metal sheet was produced to be evaluated in the same manner as in Example 3 except that the blending amount of the carbon black B was set to 31 parts by mass. The results are shown in Table 1.

Comparative Example 3

A sample for evaluation of a compression test of the rubber-laminated metal sheet was produced to be evaluated in the same manner as in Example 6 except that the blending amount of the carbon black C was set to 30 parts by mass. The results are shown in Table 1.

Comparative Example 4

A sample for evaluation of a compression test of the rubber-laminated metal sheet was produced to be evaluated in the same manner as in Example 1 except that: the blending amount of the carbon black A was set to 65 parts by mass; 60 parts by mass of calcium carbonate (trade name "Whiton SB-Red", manufactured by BIHOKU FUNKA KOGYO CO., LTD.) was used; and 5 parts by mass of silica (trade name "Nipsil E-74P", manufactured by TOSOH SILICA CORPORATION) was used. The results are shown in Table 1.

Antioxidant: 2,2,4-trimethyl-1,2-dihydroquinoline polymer (trade name "Nocrac 810-NA", manufactured by OUCHI SHINKO CHEMICAL INDUSTRIAL CO., LTD.)

Wax: wax (trade name "SUNTIGHT R", manufactured by Seiko Chemical Co., Ltd.)

Vulcanizer A: COLLOIDAL SULFUR A (manufactured by Tsurumi Chemical Industry Co., Ltd.)

Vulcanizer B: 4,4'-dithiodimorpholine (trade name "Vulnoc R", manufactured by OUCHI SHINKO CHEMICAL INDUSTRIAL CO., LTD.)

Vulcanizing accelerator A: tetrabenzylthiuram disulfide (trade name "Nocceler TBZTD", manufactured by OUCHI SHINKO CHEMICAL INDUSTRIAL CO., LTD.)

TABLE 1

| | Example | | | | | | | | | Comparative Example | | | |
|---|---|---|---|---|---|---|---|---|---|---|---|---|---|
| | 1 | 2 | 3 | 4 | 5 | 6 | 7 | 8 | 9 | 1 | 2 | 3 | 4 |
| Thickness of rubber layer (µm) | 65 | 85 | 65 | 65 | 50 | 65 | 65 | 65 | 65 | 65 | 65 | 65 | 65 |
| NBR | 100 | 100 | 100 | 100 | 100 | 100 | 100 | 100 | 100 | 100 | 100 | 100 | 100 |
| Carbon black A | 90 | 151 | | | | | | 181 | 40 | 45 | | | 65 |
| Carbon black B | | | 65 | 104 | 104 | | | | 60 | | 31 | | |
| Carbon black C | | | | | | 56 | 90 | | | | | 30 | |
| Calcium carbonate | | | | | | | | | 60 | | | | 60 |
| Silica | | | | | | | | | 30 | | | | 5 |
| Plasticizer | | | | | | | | 10 | | | | | |
| Zinc oxide | 5 | 5 | 5 | 5 | 5 | 5 | 5 | 5 | 5 | 5 | 5 | 5 | 5 |
| Stearic acid | 1 | 1 | 1 | 1 | 1 | 1 | 1 | 1 | 1 | 1 | 1 | 1 | 1 |
| Antioxidant | 2 | 2 | 2 | 2 | 2 | 2 | 2 | 2 | 2 | 2 | 2 | 2 | 2 |
| Paraffin wax | 2 | 2 | 2 | 2 | 2 | 2 | 2 | 2 | 2 | 2 | 2 | 2 | 2 |
| Vulcanizer A | 1.5 | 1.5 | 1.5 | 1.5 | 1.5 | 1.5 | 1.5 | 1.5 | 1.5 | 1.5 | 1.5 | 1.5 | 1.5 |
| Vulcanizer B | 1 | 1 | 1 | 1 | 1 | 1 | 1 | 1 | | 1 | 1 | 1 | 1 |
| Vulcanizing accelerator A | 5 | 5 | 5 | 5 | 5 | 5 | 5 | 5 | 5 | 5 | 5 | 5 | 5 |
| Vulcanizing accelerator B | 4 | 4 | 4 | 4 | 4 | 4 | 4 | 4 | 4 | 4 | 4 | 4 | 4 |
| Total | 211.5 | 272.5 | 186.5 | 225.5 | 225.5 | 177.5 | 211.5 | 312.5 | 310.5 | 166.7 | 152.5 | 151.5 | 251.5 |
| 100%-Modulus value (MPa) | 6.2 | 12.8 | 8.2 | 18.8 | 18.8 | 8.6 | 19.3 | 11.0 | 10.4 | 3.0 | 3.5 | 4.0 | 4.0 |
| Elongation (%) | 240 | 170 | 230 | 150 | 150 | 250 | 170 | 140 | 170 | 240 | 250 | 260 | 260 |
| Hardness (points) | 75 | 85 | 76 | 86 | 86 | 77 | 85 | 84 | 89 | 85 | 65 | 67 | 67 |
| Tensile strength (MPa) | 13.9 | 14.6 | 19.1 | 22.6 | 22.6 | 18.8 | 23.7 | 12.2 | 12.6 | 9.7 | 11.6 | 13.4 | 13.4 |
| Protrusion score | 4 | 5 | 5 | 5 | 5 | 5 | 5 | 5 | 5 | 2 | 1 | 3 | 3 |
| Evaluation | ○ | ◎ | ◎ | ◎ | ◎ | ◎ | ◎ | ◎ | ◎ | x | x | x | x |

NBR: a nitrile rubber (medium high nitrile (bound acrylonitrile content of 31% or more and less than 36%): trade name "Nipol DN3350", manufacture by Zeon Corporation)

Carbon black A: Medium Thermal (MT) carbon black (trade name "THERMAX N990 LSR", manufactured by Cancarb Ltd.)

Carbon black B: Semi-Reinforcing Furnace (SRF) carbon black (trade name "HTC #SS", manufactured by NIPPON STEEL Carbon Co., Ltd.)

Carbon black C: SRF carbon black (trade name "ASAHI #50HG", manufactured by Asahi Carbon Co., Ltd.)

Calcium carbonate: trade name "Whiton SB-Red" (manufactured by BIHOKU FUNKA KOGYO CO., LTD.)

Silica: trade name "Nipsil E-74P" (manufactured by TOSOH SILICA CORPORATION)

Plasticizer: trade name "ADK CIZER RS107" (manufactured by ADEKA Corporation)

Zinc oxide: (manufactured by SEIDO CHEMICAL INDUSTRY CO., LTD.)

Stearic acid: trade name "DTST" (manufactured by MIYOSHI OIL & FAT CO., LTD.)

Vulcanizing accelerator B: N-cyclohexyl-2-benzothiazylsulfenamide (trade name "Nocceler CZ-P", manufactured by OUCHI SHINKO CHEMICAL INDUSTRIAL CO., LTD.)

As found from Table 1, with the rubber-metal laminate according to the above embodiment, since the 100%-modulus value of the rubber layer was 6.0 MPa or more, pouring of the rubber in the compression test was relatively small, and any of the scores of the protrusion evaluation was 4 points or higher (Examples 1 to 9). On the carbon black, using any of the Medium Thermal carbon black and the Semi-Reinforcing Furnace carbon black, the protrusion scores were 4 points or higher (Examples 1 to 7). Even when the thickness of the rubber layer was changed to 50 µm, almost no pouring of the rubber in the compression test was observed, and the score of the protrusion evaluation was 5 points (Example 5). Also, in a case of blending the plasticizer, with the 100%-modulus value of the rubber layer being 6.0 MPa or more, almost no pouring of the rubber in the compression test was observed, and the score of the protrusion evaluation was 5 points (Example 8). Furthermore, in a case of blending calcium carbonate and silica, the pouring of the rubber in the compression test was relatively small when the 100%-modulus value of the rubber layer was 6.0 MPa or more, and the score of the protrusion evaluation was 5 points (Example 9).

In contrast, any of cases where the 100%-modulus value of the rubber layer is less than 6.0 MPa, it is found that the pouring of the rubber in the compression test is large, and the scores of the protrusion evaluation are 1 point to 3 points (Comparative Examples 1 to 4).

From the above results, it is found that, according to the above embodiment, by setting the 100%-modulus value of the rubber layer to 6.0 MPa or more and the thickness of the rubber layer to less than 80 μm, the protrusion of the rubber layer can be prevented even when the compressive stress is applied to the rubber-metal laminate, and the sealability of the rubber-metal laminate is improved.

INDUSTRIAL APPLICABILITY

As described above, the above embodiment has the effect of achieving the rubber-metal laminate and gasket that can prevent the protrusion of the rubber layer upon application of the compressive stress and that has excellent sealability of the sealing target members. The rubber-metal laminate and the gasket can be preferably used for, particularly, various gaskets such as a cylinder head gasket. In addition, according to the above embodiment, the rubber-metal laminate and the gasket can also be used for other uses such as compressors, water pumps, motors, batteries, power control units, and inverter cases.

One embodiment of the present disclosure has been described above; however, embodiments of the present disclosure are not limited by the contents of the present embodiment. In addition, components that a person skilled in the art can easily anticipate and components that is substantially same, a so-called equivalent range, are included in the above component. In addition, the above component can be appropriately combined. Furthermore, within a range not impairing the spirit of the above embodiment, omission, substitution, or modification of each of the component can be made.

The invention claimed is:

1. A rubber-metal laminate comprising:
a metal member; and
a rubber layer provided on the metal member,
wherein
the rubber layer has a 100%-modulus value in accordance with JIS K6251:2017 of 6.0 MPa or more and a thickness of less than 80 μm, and the rubber layer has a hardness in accordance with JIS K6253:2020 of 75 or more and 90 or less,
the rubber layer contains a nitrile rubber and only a single type of carbon black,
the carbon black is MT carbon or SRF carbon,
when the carbon black is the MT carbon, a blending amount of the carbon black is 85 parts by mass or more per 100 parts by mass of rubber component,
the rubber layer contains at least one of a calcium carbonate, a silica, and a plasticizer,
a blending amount of the calcium carbonate is 10 parts by mass or more and 100 parts by mass or less per 100 parts by mass of the rubber component,
a blending amount of the silica is 5 parts by mass or more and 50 parts by mass or less per 100 parts by mass of the rubber component, and
a blending amount of the plasticizer is 1 part by mass or more and 50 parts by mass or less per 100 parts by mass of the rubber component.

2. The rubber-metal laminate according to claim 1, wherein the rubber layer has a 100%-modulus value in accordance with JIS K6251:2017 of 8.0 MPa or more.

3. The rubber-metal laminate according to claim 1, wherein the rubber layer has an elongation value in accordance with JIS K6251:2017 of 100% or more.

4. The rubber-metal laminate according to claim 1, wherein the rubber layer has a thickness of 30 μm or more.

5. The rubber-metal laminate according to claim 1, wherein the rubber layer contains 28 mass % or more of carbon black based on a total mass of the rubber layer.

6. The rubber-metal laminate according to claim 1, wherein the metal member and the rubber layer are bonded with at least one adhesive selected from the group consisting of a phenolic resin and an epoxy resin disposed therebetween.

7. The rubber-metal laminate according to claim 1, wherein the rubber layer contains a nitrile rubber.

8. A gasket comprising the rubber-metal laminate according to claim 1.

* * * * *